United States Patent [19]
Reo

[11] Patent Number: 6,004,496
[45] Date of Patent: *Dec. 21, 1999

[54] METHOD OF MAKING A SILICONE RUBBER WINDSHIELD WIPER

[75] Inventor: Ned J. Reo, Saratoga Springs, N.Y.

[73] Assignee: Specialty Silicone Products, Inc., Ballston Spa, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/837,891

[22] Filed: Apr. 22, 1997

Related U.S. Application Data

[62] Division of application No. 08/603,920, Feb. 22, 1996, Pat. No. 5,716,699, which is a continuation-in-part of application No. 08/137,056, filed as application No. PCT/US93/08630, Sep. 10, 1993.

[51] Int. Cl.$^6$ .............................. B28B 7/36; C08K 83/00
[52] U.S. Cl. ...................... 264/130; 264/255; 264/338; 425/DIG. 55; 524/404; 524/406; 524/588; 525/104
[58] Field of Search ..................... 264/255, 338, 264/130; 249/115; 425/DIG. 55; 525/104; 524/406, 404, 588

[56] References Cited

U.S. PATENT DOCUMENTS

| | | |
|---|---|---|
| 3,606,630 | 9/1971 | Haas ........................ 260/92.1 |
| 3,639,938 | 2/1972 | Golden ..................... 15/250.06 |
| 3,931,381 | 1/1976 | Lindberg ..................... 264/45.5 |
| 3,972,850 | 8/1976 | Hamilton et al. .............. 260/37 SB |
| 4,030,159 | 6/1977 | Centoducati .................. 15/250.42 |
| 4,103,385 | 8/1978 | Porter ....................... 15/250.36 |
| 4,312,672 | 1/1982 | Blahak et al. ................ 106/38.22 |
| 4,517,247 | 5/1985 | Suzuki et al. ................ 428/421 |
| 4,700,425 | 10/1987 | Rusnak ....................... 15/250.41 |
| 4,863,650 | 9/1989 | Kohler et al. ................ 264/39 |
| 4,981,637 | 1/1991 | Hyer ......................... 264/146 |
| 5,025,073 | 6/1991 | Lewis et al. ................. 528/15 |
| 5,107,563 | 4/1992 | Zimmerman et al. ............. 15/250.36 |
| 5,114,268 | 5/1992 | Marcato ...................... 404/92 |
| 5,206,329 | 4/1993 | Sumpter et al. ............... 528/15 |
| 5,283,927 | 2/1994 | Gibbon et al. ................ 15/250.36 |
| 5,464,586 | 11/1995 | Wagner ....................... 264/130 |

*Primary Examiner*—Jan H. Silbaugh
*Assistant Examiner*—Suzanne E. Mason
*Attorney, Agent, or Firm*—Schmeiser, Olsen & Watts

[57] ABSTRACT

High performance silicone rubber windshield wiper blades are provided as a result of molding a tintable platinum group metal catalyzed silicone compositions having an intrinsic viscosity of less than 1.3. Improved lubricity with respect to windshield wiper glass is achieved by a molding procedure which effects a transfer such as a migration, or diffusion of release agent, for example polytetrafluoroethylene, into the surface of the silicone rubber windshield wiper blade.

20 Claims, 1 Drawing Sheet

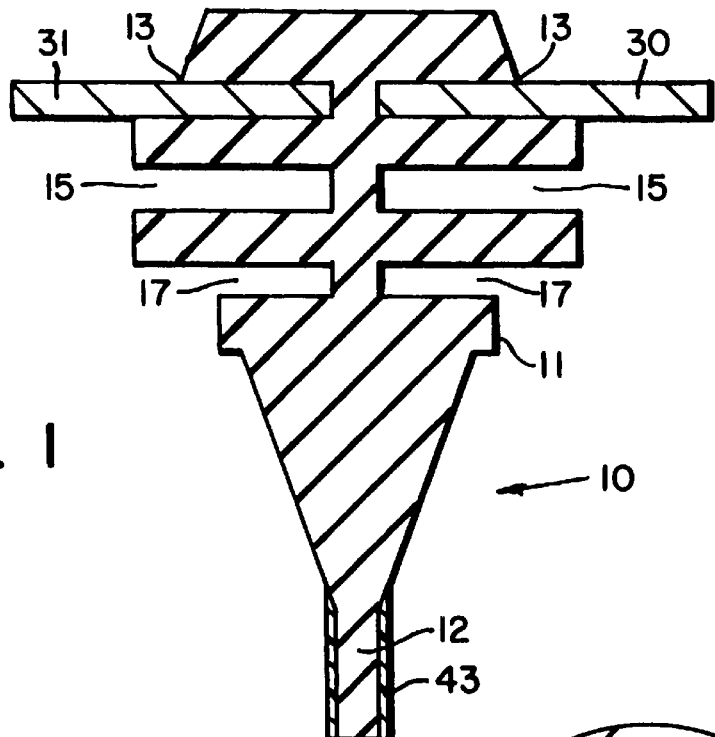
FIG. 1
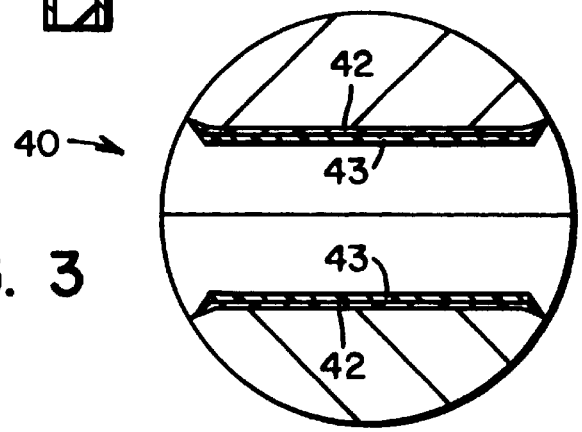
FIG. 3
FIG. 2
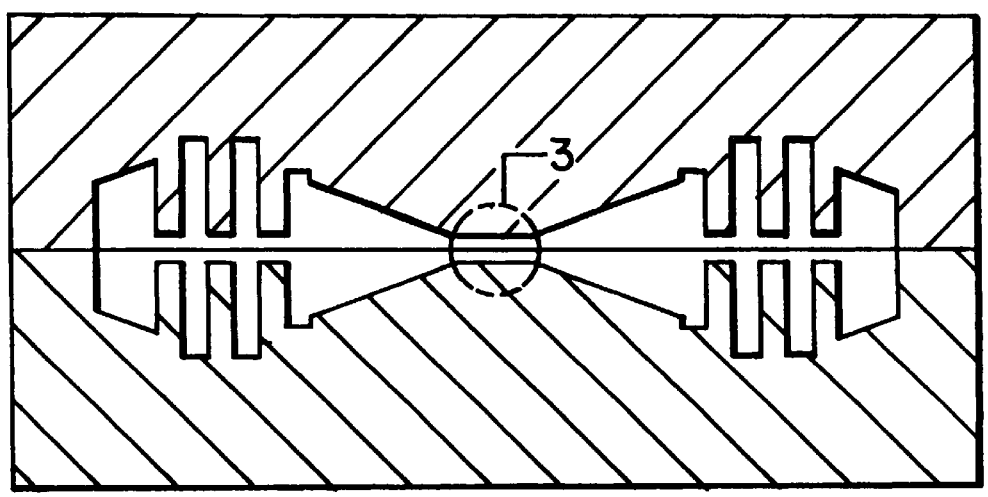

METHOD OF MAKING A SILICONE RUBBER WINDSHIELD WIPER

This application is a division of application Ser. No. 08/603,920, filed Feb. 22, 1996, now U.S. Pat. No. 5,716,699, which is a continuation-in-part application of copending application Ser. No. 08/137,056, filed Nov. 8, 1995, which is the U.S. National Phase of copending international application Ser. No. PCT/US93/08630, filed Sep. 10, 1993.

BACKGROUND OF THE INVENTION

The present invention relates to a silicone windshield wiper blade. More particularly, the present invention relates to a tintable, moldable, platinum group metal catalyzed silicone composition, and a method of converting it to a silicone windshield wiper blade exhibiting superior service life.

As discussed by Gibbons et al., U.S. Pat. No. 5,283,927, although silicone rubber is superior to natural or synthetic organic rubbers in many respects, when used for windshield wiper blades, silicone rubber has been found to have an unacceptably high coefficient of friction with respect to glass. For example, a silicone rubber wiper blade can either tear loose from the wiper arm, or it can produce an annoying loud squeak. Gibbons et al. further teach that if the specific gravity of the silicone rubber wiper blade is below a prescribed minium, such as 1.3, frictional force problems can occur with respect to contact between the wiper blade and glass.

It has been found that although cureable silicone compositions can be fabricated with excess filler to produce silicone rubber products, such as a wiper blade having a specific gravity above 1.3, such excess filler loading can have an adverse effect on the performance or service life of the fabricated product as a result of a reduction in physical properties, such as tensile strength. In addition, although pigments are sometimes used in the manufacture of rubber products, the presence of excess filler in fabricated silicone rubber often interferes with the brightness of such pigments. Experience has shown that pigments capable of reflecting incident light within a wave length range of 390 nm to 770 nm can be substantially masked in the presence of excess filler. In addition, the presence of up to 20 parts of a lubricity additive, for example polytetrafluoroethylene, or molybdenum disulfide, in a silicone windshield wiper, such as shown for example by Hamilton et al., U.S. Pat. No. 3,972,850, may also adversely effect the service life of a silicone rubber wiper blade.

It would be desireable therefore to provide a curable silicone composition which can be readily molded to a windshield wiper blade having a superior service life and a low coefficient of friction. It also would be advantageous to provide a moldable silicone composition which can be readily converted to a brightly colored windshield wiper blade.

SUMMARY OF THE INVENTION

The present invention is based on the discovery that a platinum group metal catalyzed silicone composition comprising a vinylmethylpolysiloxane, a hydrogenmethylpolysiloxane, and an effective amount by weight of fumed silica and ground glass, can be translucent and tintable, and can be molded to a high performance elastomer. Upon being molded in a windshield wiper blade mold, the resulting silicone rubber wiper blade can have a tensile psi in the range of 1100 to 1600, and a specific gravity in the range of 1.15 to about 1.29. It has been further found that if the platinum group metal catalyzed silicone composition is fabricated in a windshield wiper mold having a body portion and a blade portion and, during molding, the surface of at least the blade portion of the resulting molded silicone windshield wiper is in contact with a release agent, such as a polytetrafluoroethylene resin, the lubricity of the resulting windshield wiper blade is substantially enhanced.

There is provided by the present invention, a moldable and tintable silicone composition which comprises by weight:

(A) 100 parts of a silicone mixture comprising:
   (i) 100 parts of a vinyl-substituted organopolysiloxane;
   (ii) about 1 to about 20 parts of a siloxanehydride; and
   (iii) an effective amount of a platinum group metal catalyst; and (B) 5 to 40 parts of filler consisting essentially of:
   (iv) 80% to 95% of fumed silica; and
   (v) 5% to 20% of ground glass having an average particle size in the range of about 5 to about 15 microns.

In a further aspect of the present invention, there is provided a method for making a silicone rubber windshield wiper blade having a body portion and a blade portion, which silicone rubber wiper blade exhibits superior service life and a reduced coefficient of friction when in contact with automotive windshield glass, which method comprises molding a curable, platinum group metal catalyzed silicone composition in a mold having at least a portion of its wall surface treated with a release agent, whereby at least a partial migration or diffusion of the release agent is substantially uniformly effected from the surface of the mold into the surface of at least the blade portion of the resulting cured silicone rubber windshield wiper blade.

In an additional aspect of the present invention, there is provided a silicone rubber windshield wiper blade having a coefficient of friction with respect to automotive windshield glass in the range of about 0.1 to about 0.3, and a specific gravity of about 1.15 to about 1.29. The coefficient of friction, "C.F.", is determined by measuring the average force required to pull the end of a level 4"×½"×0.075" cured rubber slab positioned flat upon a sheet of glass, where the rubber slab supports a 3"×1.5", 1.7 lb aluminum weight. The rubber slab and aluminum weight are pulled across a 12"×18"×⅜" automotive glass surface, or equivalent thereof, for a distance suffient to obtain a reading on a Normark (1-101b) Electronic Digital Scale (shown in U.S. Pat. No. 4,936,399). The C.F. is measured as follows:

C.F.=force required to move weighted rubber slab on glass surface 17

Release agents which can be used to treat the mold wall surface in accordance with the practice of the invention are, for example, polytetrafluoroethylene, e.g., TEFLON® made by Dupont Chemical Co., Wilmington, Del., additional release agents are, for example, molybdenum disulfide, graphite, and boron nitride.

The vinyl-substituted organopolysiloxanes, or "vinylsiloxanes" which can be used in making the moldable tintable silicone compositions of the present invention can have a viscosity of from about 100 to 50×10$^6$ centipoises at 25° C. Vinyl substitution can be on the polysiloxane backbone, or the vinyl siloxane can be shown as follows:

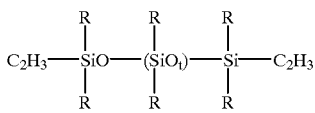

(1)

where $C_2H_3$ is vinyl, and R is selected from $C_{(1-13)}$ monovalent organic radicals free of olefinic unsaturation, and t is a positive integer having a value sufficient to provide a vinyl siloxane viscosity as previously described. Preferably, R is selected from alkyl radicals of 1 to 8 carbon atoms, such as methyl, ethyl, propyl; monovalent aryl radicals such as phenyl, methylphenyl, ethylphenyl; cycloalkyl radicals, cycloheptyl and haloalkyl radicals such as 3,3,3-triflouropropyl. The vinyl siloxane can have terminal units of the formula, $C_2H_3(CH_3)_2SiO_{0.5}$, and total vinyl can vary from about 0.05 to about 3.5 mole percent, based on the total chemically combined siloxy units, and preferably from 0.14 to about 2 mole percent.

The vinylsiloxane of formula (1) can be prepared by equilibrating cyclotetrasiloxane with a vinyl terminated low molecular weight polysiloxane chainstopper. However, if vinyl organosiloxy units are desired in the backbone, a predetermined amount of cyclic vinylorganosiloxane can be used in the equilibration mixture. The chainstopper is preferably a low molecular weight vinyl terminated organopolysiloxane, such as the corresponding disiloxane, trisiloxane, tetrasiloxane. These low molecular weight vinyl terminated polysiloxane polymers are produced by hydrolyzing the appropriate chlorosilanes particularly vinyldiorganochlorosilane along with diorganodichlorosilane to produce the desired vinyl chainstopped polydiorganosiloxanes. The equilibration catalyst which can be used is preferably a mild acid catalyst, such as toluenesulfonic acid or an acid treated clay. An alkali metal hydroxide as the catalyst such as potassium or sodium hydroxide also can be used as the equilibration catalyst. When the equilibration has proceeded to the point where about 85% of the cyclopolysiloxane has been converted to linear polymer, the acid catalyst can be neutralized or filtered out. Preferably, excess cyclics are stripped off so that the linear polymer will have a low volatile content.

Included within the siloxane hydride is a "coupler", having the formula,

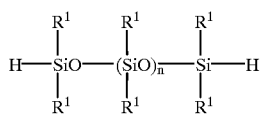

(2)

where $R^1$ is selected from $C_{(1-13)}$ monovalent organic radicals free of olefinic unsaturation and n is an integer having a value sufficient to provide the "coupler" with a viscosity of 1 to 500 centipoises at 25° C. and from about 3 to 9 mole percent of chainstopping diorganohydride siloxy units, based on the total moles of chemically combined siloxy units in the siloxane hydride.

In addition to the coupler of formula (2), the siloxane hydride used in the heat curable polysiloxane compositions of the present invention also can include siloxane hydride resins consisting essentially of the following chainstopping unit,

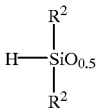

condensed with silicate ($SiO_2$) units, where the $R^2$+H to Si ratio can vary from 1.0 to 2.7. A discussion of silicone resins is shown in Rochow Chemistry of the Silicones, pp. 90–94, Second Edition, John Wiley and Sons, NY, 1951, which is incorporated herein by reference. Siloxane hydride resins also can have the above condensed chainstopping units chemically combined with $SiO_2$ units and $(R^3)_2SiO$ units, where the $R^2+R^3$+H to Si ratio can vary from 1.2 to 2.7, where $R^2$ and $R^3$ are $C_{(1-3)}$ monovalent organic radicals free of olefinic unsaturation and can be selected from $R^1$ radicals.

The siloxane hydride resins can be made by hydrolyzing the corresponding hydride chlorosilanes in the presence of an organic hydrocarbon solvent. To prepare resins having only monofunctional $(R^2)_3SiO_{0.5}$ units and tetrafunctional $SiO_2$ units, there can be cohydrolyzed a hydrogen diorganochlorosilane and tetrachlorosilane. Resins having monofunctional siloxy units, difunctional siloxy units, and tetrafunctional siloxy units, can be obtained by hydrolyzing a hydrogendiorganochlorosilane, tetrachlorosilane and a diorganodichlorosilane at particular ratios. Additional siloxane hydride resins which can be used are shown by Jeram, U.S. Pat. No. 4,040,101 which is incorporated herein by reference.

The siloxane hydride also can include linear organopolysiloxane having the formula,

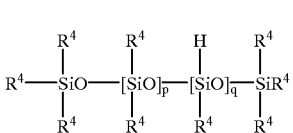

(3)

where $R^4$ is a $C_{(1-3)}$ monovalent organic radical free of olefinic unsaturation, and p and q are integers having values sufficient to provide a polymer having a viscosity of from 1 to 1,000 centipoises at 25° C., and wherein the polysiloxane has from 0.04 to 1.4 by weight of hydrogen.

The siloxane hydride of formula (3) can be produced by equilibrating the appropriate hydrogencyclopolysiloxane with the appropriate cyclopolysiloxane containing $R^4$ substituent groups, in combination with low molecular weight linear triorganosiloxane chainstoppers.

In formulas (2) and (3), and the above siloxane hydride resins, the chemically combined units can have $R^1$, $R^2$, $R^3$ and $R^4$ radicals, which can be the same or different and are selected from alkyl radicals having from 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The siloxane hydride of formula (2) is prepared by either a hydrolysis process or by an acid catalyzed equilibration process. In the equilibration process, cyclopolysiloxane is equilibrated with a low molecular weight hydrogen terminated chainstopper, such as a dihydrogentetraorganodisiloxane. The acid catalyzed equilibration reaction is similar to the method used for the production of the vinyl containing base polymer. In the hydrolysis process, hydrogendiorganochlorosilane is hydrolyzed with diorganodichlorosilanes to produce the polymer of formula (2). The resulting siloxane hydride can be separated from undesirable cyclics by stripping.

Platinum group metal catalysts which can be employed in the one part heat curable compositions of the present invention include those based on the metals rhodium, ruthenium, palladium, osmium, iridium and platinum. Especially preferred are the well known platinum and rhodium catalysts, such as the platinum hydrocarbon complexes described in U.S. Pat. Nos. 3,159,601 and 3,159,662 to Ashby, the platinum alcoholate catalysts described in U.S. Pat. No. 3,220,970 to Lamoreaux, the platinum complexes of U.S. Pat. No. 3,814,730 to Karstedt, the platinum chloride-olefin complexes described in U.S. Pat. No. 3,516,946 to Modic and the rhodium complexes described in U.S. Pat. No. 4,262,107 to Eckberg, all of which are incorporated herein by reference. Cure inhibitors also can be used to improve the shelf life of the curable compositions. These inhibitors include the ynes, such as 3-methylpentene-1-yne and 3,5-dimethyl-1-hexyne-3-ol, and the alkynyl alcohols, such as 3-methyl-1-butyne-3-ol. Additional inhibitors are ethylenically unsaturated isocyanates shown by Berger et al., U.S. Pat. No. 3,882,083, and U.S. Pat. Nos. 4,472,562 and 4,472,563 incorporated herein by reference.

An effective amount of the platinum group metal catalyst of the present invention is that amount which is sufficient to provide from 5 ppm to 200 ppm of platinum group metal based on the weight of heat curable organopolysiloxane compound composition, and preferably from 10 ppm to 100 ppm.

In addition to fumed silica and particulated glass, other fillers which can be used in minor amounts, such as up to 10% by weight of silicone, without substantially altering the aformentioned specific gravity of the resulting wiper blade, are, for example, precipitated silica and diatomaceous earth.

The term "glass" as used in the practice of the invention, preferably means soda lime glass, or borosilicate glass having a particle size in the range of 1.4 $\mu$m to 88 $\mu$m.

Additional additives also can be used, such as: mineral pigments, for example, zinc oxide, zinc sulphide, lithopone, chrome yellow, iron oxide, ultramarine, and lampblack; process aids; and plasticizers.

BRIEF DESCRIPTION OF THE DRAWINGS

Novel features of the articles of this invention are illustrated in the drawings accompanying and forming a part of this specification, in which:

FIG. 1 is an enlarged transverse sectional view of a silicon windshield wiper blade of this invention;

FIG. 2 is a transverse sectional view of a mold for producing a siamese pair of FIG. 1 windshield wipers; and FIG. 3 is an enlarged view of the necked portion of the FIG. 2 mold showing a polytetrafluorethylene resin coating on the mold inside surface.

DETAILED DESCRIPTION OF THIS INVENTION

In the presently preferred practice of the invention, the platinum group metal catalyzed silicone composition is molded in the form of windshield wiper blade 10 having an elongated body portion 11 and a basic blade portion 12 projecting therefrom. The body portion has three pair of recesses 13, 15 and 17 extending axially from one end of the body 10 to near the other end thereof. Between blind end 20 of each of recesses 15 and 17 a short recess (not shown), blind at both ends, is provided to receive and retain flanged gripping elements of a windshield wiper blade mounting structure (not shown) typically of the bow type presently in general use.

Thin metal mounting strips 30 and 31 are carried in recesses 13 and extend almost the full length of the mounting structure. Blade 10 as offered for sale as original or replacement equipment may commonly be provided as a combination of blade 10 and one or both of the mounting strips. Alternatively, blade 10 may be marketed as part of an assembly including mounting structure of the conventional bow type or other form which is provided with attachment means securing blade 10 with or without a metal mounting strip.

In making the product of this invention, the heat curable platinum catalyzed silicone composition is introduced into a mold 40 as shown in FIGS. 2 and 3. The mold 40 includes a permanent polytetrafluoreothylene e.g., TEFLON® made by Dupont Chemical Co., Wilmington, Del. resin coated surface 42. Prior to mold contact, it is preferred to apply to the surface of the silicone composition or interior of mold 40 with additional release agent to achieve optimum results. Such release agent treatment can be achieved by spraying, wiping, or dipping procedures. The "permanent" polytetrafluoroethylene resin coating 42 on the inside mold surface, shown a 42, is preferably achieved by dip coating the mold in a fluid mixture of a nickel containing material and polytetrafluoroethylene resin and thereafter baking it at a temperature of about 750° C. for about one hour. A polytetrafluoroethylene resin coating thickness of 3 to 6 mils is typical. A preferred coating procedure is the poly-ond metal plating process of the Polyond Co. of Chicopee Mass. Suitable metal molds which can be treated can be formed from steel, cast iron, aluminum, brass and bronze. As discussed, an overlay coating of release agent, such as polytetrafluoroethylene, can be applied, if desired, onto the surface of the permanent polytetrafluoroethylene resin coating 42 or the heat curable platinum catalyzed silicone composition prior to injection into mold 40.

Compression molding of the curable silicone composition can be effected at temperatures in the range of about 175° C. to about 185° C. and pressures in the range of about 300 psi to 1500 psi. While compression molding is preferred, injection molding and transfer molding also can be used. In certain instances, extrusion of the curable silicone composition at 200° C. to 300° C. can also be used effectively, without pretreatment with release agent. Under such circumstances, optimum results may not be achieved, while cure can be effected by using hot air vulcanization.

As noted above, if desired, polytetrafluoroethylene can be used as a thin film cut to size and shape and fitted in place on the mold interior surface. It may be used to provide release action to only that part of the blade surface which is to engage the windshield in a wiping or clearing action by being cut in an appropriate pattern.

The following examples are given by way of illustration and not by way of limitation. All parts shown are by weight unless otherwise specified.

EXAMPLE 1

A compression moldable silicone composition is prepared on a two-roll rubber mill. There is milled together, 70 parts of SE860, 30 parts of SE 875 and 1.0 part of CA4, obtained from the GE Silicone Products Dept. of Waterford, N.Y. Along with the aformentioned ingredients, there is added, sufficient fumed silica and ground glass to produce a blend of having a specific gravity of about 1.25. The resulting blend also comprises about 25 ppm of a platinum catalyst shown by Karstedt, U.S. Pat. No. 3,775,452, a vinyl containing polydimethylsiloxane gum having a viscosity of about $20 \times 10^6$ centipoise, and a siloxane hydride fluid having about 0.8% by weight hydrogen, which consists essentially of condensed dimethylsiloxy units and methylhydrogensiloxy units. The ground glass is a soda lime glass and present at about 6% by weight based on the silicone composition; it has a particle size in the range of 1.4 $\mu$m to 88 $\mu$m and is obtained from Potter Industries Inc., Carlstadt, N.J. The resulting moldable silicone composition also contains 0.01% by weight of a platinum catalyst cure inhibitor.

A milled sheet is prepared from the above silicone composition cut into strips. The curable silicone strips are sprayed with polytetrafluoroethylene resin and placed in a mold as shown in the drawings. The mold has a "permanent" uniform 4 mils polytetrafluoroethylene resin coating baked on the inside surface of the siamese portion of the mold.

The silicone composition is compression molded at 177° C. and 1,444 psi. The resulting twin silicone windshield wiper blade is then cut at the midpoint of the siamese section. There is obtained a silicone windshield wiper blade having a specific gravity of about 1.25, a tensile psi of 1200 and a Shore hardness of 60 to 65. Based on these physical properties, the silicone windshield wiper blade has a predictable extended service life in accordance with the standards shown in the Chemical Resistance Test of the Society of Automotive Engineers SAEJ903C Section 3.2.3, and Japanese Industrial Standard JISD5710-1982 Sections 7.1.7.2, and 7.4, Wipe Performance and Durability.

The Coefficient of Friction ("C.F.") of the silicone wiper blade of the present invention is measured using compression molding 4"×½"×0.075" test strips. It is found that the silicone wiper blade of the present invention has superior lubricity as shown by a C.F. value of 0.22 when it is compared to the C.F. using similar test strips of a commecially available organic wiper material which shows a C.F.value of 0.26, or the C. F. value of 0.46 which is obtained by testing similiarly prepared silicone compression molded wiper blade test strips molded in the absence of a polytetrafluoroethylene resin coating on the mold and/or treatment with a release agent prior to molding.

Based on the molding procedure used, it is also estimated that up to about 0.2 mil of polytetrafluoroethylene resin has migrated into the surface of the wiper blade made in accordance with the invention.

EXAMPLE 2

The procedure of example 1 is repeated, except that 1.5 parts of red pigment K711880 from Dispersion Technology Inc. of Lakewood, N.J., per 100 parts of silicone is added to the total blend during milling. Following a molding procedure similar to Example 1, there is obtained a bright red silicone windshield wiper blade. In contrast, addition of the same amount of red pigment to a moldable silicone composition cover table to a wiper blade having a specific gravity of 1.55, results in a pigmented wiper blade whose red color is found to be substantially masked. The physical properties of the 1.55 specific gravity wiper blade are also found to be substantially below the wiper blade of Example 1.

What is claimed is:

1. A method for making a silicone rubber windshield wiper exhibiting an improved reduction in the coefficient of friction when in contact with automotive windshield glass, comprising the steps of:

providing a mold having at least a portion of an interior surface thereof pretreated with polytetrafluoroethylene resin;

applying a release agent to a surface of a heat curable platinum catalyzed silicone composition to be formed into the wiper;

introducing the heat curable platinum catalyzed silicone composition into the mold to create the wiper; and curing the heat curable platinum catalyzed silicone composition to form the wiper.

2. The method of claim 1, wherein the heat curable platinum catalyzed silicone composition is compression molded.

3. The method of claim 1, wherein the heat curable platinum catalyzed silicone composition is transfer molded.

4. The method of claim 1, wherein the heat curable platinum catalyzed silicone composition is injection molded.

5. The method of claim 1, wherein the heat curable platinum catalyzed silicone composition is extruded.

6. The method of claim 1, wherein the release agent is polytetrafluoroethylene.

7. The method of claim 1, wherein the release agent diffuses into the surface of the wiper to a depth of about 0.001 mil to about 0.5 mil.

8. The method of claim 1, further comprising the step of applying the release agent to an interior surface of the mold.

9. The method of claim 8, wherein the release agent is polytetrafluoroethylene.

10. The method of claim 1, wherein the step of applying a release agent includes one or more of spraying, wiping or dipping.

11. A method for making a silicone rubber windshield wiper exhibiting an improved reduction in the coefficient of friction when in contact with automotive windshield glass, comprising the steps of:

providing a mold having at least a portion of an interior surface thereof pretreated with polytetrafluoroethylene resin;

applying a release agent to a surface of a silicone rubber composition to be formed into the wiper;

introducing the silicone rubber composition into the mold to create the wiper; and curing the silicone rubber composition to form the wiper.

12. The method of claim 11, wherein the silicone rubber composition is compression molded.

13. The method of claim 11, wherein the silicone rubber composition is transfer molded.

14. The method of claim 11, wherein the silicone rubber composition is injection molded.

15. The method of claim 11, wherein the silicone rubber composition is extruded.

16. The method of claim 11, wherein the release agent is polytetrafluoroethylene.

17. The method of claim 11, wherein the release agent diffuses into the surface of the wiper to a depth of about 0.001 mil to about 0.5 mil.

18. The method of claim 11, further comprising the step of applying the release agent to an interior surface of the mold.

19. The method of claim 18, wherein the release agent is polytetrafluoroethylene.

20. The method of claim 11, wherein the step of applying a release agent includes one or more of spraying, wiping or dipping.

* * * * *